United States Patent
Fey

(10) Patent No.: US 12,466,133 B2
(45) Date of Patent: Nov. 11, 2025

(54) RADIAL FLOW OVER A CONSTRUCTION AREA

(71) Applicant: AMCM GMBH, Starnberg (DE)

(72) Inventor: Georg Fey, Munich (DE)

(73) Assignee: AMCM GMBH, Starnberg (DE)

( * ) Notice: Subject to any disclaimer, the term of this patent is extended or adjusted under 35 U.S.C. 154(b) by 221 days.

(21) Appl. No.: 17/309,333

(22) PCT Filed: Nov. 7, 2019

(86) PCT No.: PCT/EP2019/080516
§ 371 (c)(1),
(2) Date: May 19, 2021

(87) PCT Pub. No.: WO2020/104202
PCT Pub. Date: May 28, 2020

(65) Prior Publication Data
US 2022/0032545 A1    Feb. 3, 2022

(30) Foreign Application Priority Data
Nov. 19, 2018    (DE) .................... 10 2018 129 022.5

(51) Int. Cl.
*B29C 64/364*    (2017.01)
*B22F 10/28*    (2021.01)
(Continued)

(52) U.S. Cl.
CPC ............ *B29C 64/364* (2017.08); *B22F 10/28* (2021.01); *B22F 10/322* (2021.01); *B22F 12/38* (2021.01);
(Continued)

(58) Field of Classification Search
CPC ........ B22F 12/70; B22F 10/322; B22F 12/38; B22F 12/00; B22F 10/00; B29C 64/364;
(Continued)

(56) References Cited

U.S. PATENT DOCUMENTS

| 2006/0108712 A1* | 5/2006 | Mattes | ................... B33Y 10/00 |
| | | | 425/375 |
| 2015/0174823 A1* | 6/2015 | Wiesner | ................... B22F 12/50 |
| | | | 264/497 |

(Continued)

FOREIGN PATENT DOCUMENTS

| BR | 102016008220 A2 | 10/2017 |
| CN | 106256464 A | 12/2016 |

(Continued)

OTHER PUBLICATIONS

Mueller, G. "Machine Translation of DE 102004031881 A1: Device for sucking gases, vapors and/or particles out of working region of laser processing machine." EPO. Espacenet. 2023 (Year: 2023).*

(Continued)

*Primary Examiner* — Susan D Leong
*Assistant Examiner* — Jonathan B Woo
(74) *Attorney, Agent, or Firm* — Polsinelli PC

(57) ABSTRACT

A flow system and a flow arrangement for flowing a building material in a building field of a manufacturing device for additive manufacturing includes an outer flow guide having an opening connectable to a gas discharge for discharging gas from a process chamber of the device, and a second flow opening connectable to a gas supply for supplying gas into the process chamber, the outer flow guide and a central flow guide are outside the building field, the building field extends radially from a building field recess not usable for manufacturing, wherein the outer flow guide is outside of the building field, and the central flow guide is in a central building field recess region, which is arranged outside in an inward radial direction of the building field, to generate gas flow running in radial flow direction over the building field.

18 Claims, 5 Drawing Sheets

(51) Int. Cl.
*B22F 10/322* (2021.01)
*B22F 12/00* (2021.01)
*B22F 12/45* (2021.01)
*B22F 12/70* (2021.01)
*B29C 64/124* (2017.01)
*B29C 64/35* (2017.01)
*B33Y 10/00* (2015.01)
*B33Y 40/00* (2020.01)
*B33Y 50/02* (2015.01)

(52) U.S. Cl.
CPC .............. *B22F 12/45* (2021.01); *B22F 12/70* (2021.01); *B29C 64/124* (2017.08); *B29C 64/35* (2017.08); *B33Y 10/00* (2014.12); *B33Y 40/00* (2014.12); *B33Y 50/02* (2014.12)

(58) Field of Classification Search
CPC ..... B29C 64/25; B29C 64/255; B29C 64/245; B29C 64/00; B33Y 30/00; B33Y 10/00
See application file for complete search history.

(56) References Cited

U.S. PATENT DOCUMENTS

| | | | | |
|---|---|---|---|---|
| 2016/0368050 A1* | 12/2016 | Morris | .................. | B29C 64/245 |
| 2017/0216916 A1 | 8/2017 | Nyrhilä et al. | | |
| 2018/0029128 A1 | 2/2018 | Herzog et al. | | |
| 2018/0065303 A1* | 3/2018 | Schade | ................. | B29C 64/153 |
| 2018/0311731 A1* | 11/2018 | Spicer | .................... | B33Y 40/00 |
| 2019/0099943 A1* | 4/2019 | Connell | ................. | B22F 12/70 |
| 2019/0143406 A1* | 5/2019 | Carter | ..................... | B33Y 30/00 264/109 |
| 2019/0270138 A1 | 9/2019 | Ullmann et al. | | |
| 2020/0094320 A1* | 3/2020 | Krol | ........................ | B33Y 40/00 |
| 2020/0346409 A1* | 11/2020 | Mercelis | ................ | B33Y 30/00 |
| 2021/0122117 A1* | 4/2021 | Schade | ................. | B29C 64/371 |

FOREIGN PATENT DOCUMENTS

| | | | | | |
|---|---|---|---|---|---|
| CN | 107457988 A | | 12/2017 | | |
| CN | 107921659 A | | 4/2018 | | |
| CN | 108472875 A | | 8/2018 | | |
| CN | 108602274 A | | 9/2018 | | |
| CN | 108712958 A | | 10/2018 | | |
| DE | 102004031881 A1 | * | 1/2006 | .......... | B08B 15/007 |
| DE | 102013210242 A1 | | 12/2014 | | |
| DE | 102014205875 A1 | | 10/2015 | | |
| DE | 102014218639 A1 | | 3/2016 | | |
| DE | 102015010387 A1 | | 2/2017 | | |
| DE | 102016209933 A1 | | 12/2017 | | |
| EP | 2862651 A1 | | 4/2015 | | |
| EP | 3053720 A1 | | 8/2016 | | |
| EP | 3378584 A1 | | 9/2018 | | |
| GB | 2543305 A | * | 4/2017 | ............. | B33Y 30/00 |
| WO | WO-2014195068 A1 | * | 12/2014 | ........... | B22F 3/1055 |
| WO | WO-2018013057 A1 | * | 1/2018 | | |
| WO | WO-2018087251 A1 | | 5/2018 | | |
| WO | WO-2019115140 A1 | * | 6/2019 | | |
| WO | WO-2020104202 A1 | | 5/2020 | | |

OTHER PUBLICATIONS

EPO. "Annex to Communication from the Examining Division dated Oct. 17, 2023." 2023. Espacenet. (Year: 2023).*
Google. "Machine Translation of Annex to Communication from the Examining Division dated Oct. 17, 2023." generated on Dec. 27, 2023. Google Translate. (Year: 2023).*
Geisen O. "English Machine Translation of WO-2019115140-A1". Feb. 10, 2025. Espacenet. EPO. (Year: 2025).*
Deiss O. English Machine Translation of WO-2014195068-A1:. Feb. 10, 2025. Espacenet. EPO. (Year: 2025).*
"Chinese Application No. 201980085853.0, Notification of the First Office Action mailed Oct. 31, 2022", (Oct. 31, 2022), 23 pgs.
"Chinese Application No. 201980085853.0, Notification of Second Office Action dated Apr. 11, 2023", (Apr. 11, 2023), 20 pgs.
"German Application No. 10 2018 129 022.5, Search Report dated Aug. 21, 2019", (Aug. 21, 2019), 8 pgs.
"International Application No. PCT/EP2019/080516, International Search Report and Written Opinion mailed Feb. 20, 2020", (Feb. 20, 2020), 16 pgs.
"International Application No. PCT EP2019 080516, International Preliminary Report mailed Jun. 3, 2021", 10 pgs.
"European Application 19801291.6, European Search Report mailed Oct. 17, 2023", with machine English translation, (Oct. 17, 2023), 14 pages.

* cited by examiner

Y-Y

RADIAL FLOW OVER A CONSTRUCTION AREA

PRIORITY CLAIM TO RELATED APPLICATIONS

This application is a U.S. national stage filing under 35 U.S.C. § 371 from International Application No. PCT/EP2019/080516, filed on 7 Nov. 2019, and published as WO2020/104202 on 28 May 2020, which claims the benefit under 35 U.S.C. 119 to German Application No. 10 2018 129 022.5, filed on 19 Nov. 2018, the benefit of priority of each of which is claimed herein, and which applications and publication are hereby incorporated herein by reference in their entirety.

The invention relates to a flow system for flowing a field of a manufacturing device for additive manufacturing of three-dimensional components, a flow arrangement with said flow system, a manufacturing device for the additive manufacturing of three-dimensional components and a manufacturing method for the additive manufacturing of three-dimensional components.

BACKGROUND

Additive manufacturing devices and corresponding manufacturing processes are generally characterized by building objects (components) by solidifying a shapeless building material layer by layer. The solidification can be brought about by supplying thermal energy to the building material by irradiating it with electromagnetic radiation or particle radiation, for example in laser sintering ("SLS" or "DMLS"), laser melting or electron beam melting. In laser sintering or laser melting, the area of impact of the laser beam (laser spot) on a layer of the building material is moved over those areas of the layer which correspond to the component cross-section of the component to be manufactured in this layer. A thin layer of a powdered building material is repeatedly applied, and the building material in each layer is selectively solidified locally by selective irradiation with a laser beam. Instead of applying thermal energy, the applied building material can also be selectively solidified by 3D printing, for example by applying an adhesive or binder. Devices and processes that work in this way are used, for example, in rapid prototyping, rapid tooling or additive manufacturing. Several irradiation units are often used, especially for irradiating larger building fields for correspondingly large components.

SUMMARY

The invention generally relates to the additive manufacturing of three-dimensional components by layer-by-layer application and locally selective solidification of a building material within a building field.

Various types of building materials can be used, in particular powders such as metal powders, plastic powders, ceramic powders, sand, and filled and/or mixed powders.

Usually, the building fields of such manufacturing devices or 3D printers are flowed over as a whole from one edge to the other edge of the building field in one direction in order to remove impurities of the manufacturing process such as spatter, smoke and vapors by means of a gas. The aim is to achieve a laminar flow. A laminar flow is intended to prevent turbulence, i.e. swirls of the overflowing gas, from affecting the ideally flat and uniform surface of the powder layer of the building field. For example, turbulence could lead to displacement of the powder building material, i.e., to local ablation or accumulation of the powder in the building field. This would impair the building process, which is based on the buildup of uniform layers.

The characteristic number for the fluid mechanical description of a flow as laminar or turbulent is the Reynolds number. In addition to the flow velocity, the density and the viscosity of the flowing fluid (gas), this characteristic depends on the characteristic length of the flow. In the case of flow over a building field, this length is given by a dimension of the building field. At the same flow velocity, a flow that would be laminar in a small building field can turn into a turbulent flow in a larger building field. In additive manufacturing of large components, there is therefore the problem that flow over the entire building field in one direction is only possible up to a certain size of the building field or component without the flow becoming turbulent. A reduction in the flow velocity would have a negative effect on the amount of impurities that can be removed and thus on the achievable process speed.

EP 2 862 651 A1 discloses a flow device with two gas inlets and outlets arranged on the walls of the process chamber at the side of the building field and a gas outlet and inlet arranged centrally above the building field. The continuous building field is divided into overlapping irradiation areas, each of which can be irradiated by an irradiation unit assigned to the irradiation area. The building field below the central gas outlet or inlet is shaded from above by the gas outlet or inlet. Only if a sufficient vertical distance of the central gas outlet or inlet from the building field is maintained, this area can be reached from the side by beams of the irradiation units directed obliquely downwards.

In DE 10 2016 209 933 A1, nozzles opposite each other with respect to the impinging laser beam are moved along with the laser beam and the application device to flow over the building field.

In DE 10 2014 218 639 A1, inflow and outflow openings for the gas are moved over the building field together with the irradiation device in order to irradiate the building field.

The solutions known from the state of the art have the disadvantage that they do not permit optimum flow guidance, in particular not at the smallest possible distance above the building field, and/or require complicated control of the moving flow device and the irradiation units. The achievable production speeds are thus limited, especially for large components manufactured in correspondingly large building fields. For irradiation devices that are arranged in the immediate vicinity of the irradiation units or coupled to them, there is also a risk of mutual interference during the manufacturing process when several irradiation units are used.

The present invention therefore has the objective of providing a flow device, a manufacturing device and a corresponding manufacturing method for additive manufacturing, which are suitable in particular for large components, in particular for components whose building field has a recess region. The aim is to achieve improved flow guidance over large building fields, in particular over such building fields that have a recess region. In particular, the aim is to achieve the highest possible production speed with high component quality.

This objective is solved by a flow system according to claim 1, a flow arrangement according to claim 11, a manufacturing device according to claim 13 and a manufacturing method according to claim 18.

In particular, the objective is solved by a flow system for flowing a building field of a manufacturing device for additive manufacturing of three-dimensional components by layer-by-layer application and locally selective solidification of a building material within the building field by means of a plurality of irradiation units, wherein the flow system comprises:

at least one outer flow guide with at least one flow opening and at least one central flow guide with at least one flow opening, wherein at least one first flow opening is connectable in a gas-conducting manner to a gas discharge for discharging gas from a process chamber of the manufacturing device, and at least one second flow opening is connectable in a gas-conducting manner to a gas supply for supplying gas into the process chamber, wherein the outer flow guide and the central flow guide are configured to be arranged outside a building field usable for manufacturing the component, wherein the, in particular annular, building field extends in a radial direction and is delimited by a, preferably central, building field recess which is not usable for manufacturing the component, wherein the outer flow guide is configured to be arranged in a building field outer region, which is arranged outside in an outward radial direction of the building field, and the central flow guide is configured to be arranged in a, preferably central, building field recess region, which is arranged outside in an inward radial direction of the building field, to generate in particular one gas flow running in at least one essentially radial flow direction over the building field.

One idea of the invention is to exploit the shape of the building field or of the component to be manufactured in order to design a turbulent flow system or arrangement in such a way that the characteristic length of the flow is reduced. In this way, a transition from a laminar flow to a turbulent flow can be prevented. In particular, the flow path of a flow over the building field is kept as short as possible by a flow system or flow arrangement according to the invention. Moreover, such a flow system or arrangement is simple in design. In addition, the flow system, in particular the central flow guide, can be arranged in the immediate vicinity of the building field, which results in improved flow guidance with regard to its effect.

Additive manufacturing of the three-dimensional component is carried out in particular by layer-by-layer application in a vertical direction and locally selective solidification of a (shapeless) building material, preferably powder, within the building field. The vertical direction runs in particular (vertically) parallel to a longitudinal axis of the manufacturing device, with a working plane preferably extending (horizontally) perpendicular thereto. The longitudinal axis can be understood as an axis of symmetry of the (cylindrical) process chamber of the manufacturing device. In particular, the working plane and the building field lying therein remain at the same height (in the vertical direction) during the (entire) manufacturing process. Several components can be manufactured simultaneously in one building field.

A building field can be understood as a two-dimensional region (2D partial region) of the working plane of the manufacturing device for additive manufacturing, in which the beams of the irradiation units can impinge on the building material for selective solidification or in which a building container extends which receives the component and (also) contains the (unsolidified) building material. In this respect, the surface of the building field can be used for manufacturing. In particular, the building field can be understood as the top powder layer (2D surface). The building field recess can be understood as a region recessed from the building field, which the beams of the irradiation units do not reach or over which the build container does not extend.

A building field region can be understood as a three-dimensional region (directly) above the building field, which has the same extension (cross-sectional area or base area) as the building field. In particular, the building field recess region does not belong to the building field region. In particular, the region of the building field recess represents a cross-sectional area of the building field recess region. The building field recess region can be understood as a region at least partially surrounded or enclosed by the building field region. In this respect, the building field recess region can also be referred to as a central or inner region (with respect to the building field region or the building field). In particular, the building field outer region (located radially outwards the building field region) and the building field recess region (located radially inwards outside the building field region) complement each other with the building field region to form the space surrounding the building container (and the building field), both below and above the working plane and at the same level as the working plane. In other words, the space above the working plane and to the side of the building container could be decomposed into the building field outer region, the building field region, and the building field recess region, with the building field being congruent with the footprint of the building field region. The building field region could be considered as the gas-filled spatial region (3D space) above the building field (2D surface). In this respect, the parts of the building field recess region and the building field outer region above the working plane together are the complementary space to the building field region. The building field recess region can be connected to the building field outer region, for example if the building field has a U-shape. In particular, the shape of a building field or a building field region having a building field recess region in the sense of the invention could be defined such that the centroid of the area of the building field is located outside the contours (the edge) or the surface of the building field, for example in the case of an annular or U-shaped building field. More specifically, the building field could be defined by an outer (closed) perimeter line and an inner (closed) perimeter line, which in particular delimit a radially extending building field, with the inner perimeter line delimiting the building field recess (2D surface) from building field (2D surface).

In particular, several irradiation units are distributed above or around the building field. In particular, the irradiation units are designed to irradiate the building field simultaneously. The building field can be divided into segments, e.g., circular segments or ring segments, whereby each segment can be assigned an irradiation unit. The flow according to the invention can also be used to flow over a coupling window and/or one or more irradiation units.

A radial direction can run from the central flow guide towards the outer flow guide, or vice versa. Preferably, the gas flow runs over the (entire) circumferential direction of the building field or the component (at any point on the circumference) in a radial direction, i.e. in particular inwardly or outwardly. The gas flow can be directed away from a center of the building field (on both sides), i.e. from the center to the outside and inside, or (from both sides) towards the center of the building field, i.e. from the outside and inside to the center.

The outer and central flow guides can be provided separately from each other, i.e. in particular not (directly) structurally connected to each other. Preferably, the outer and/or central flow guide(s) is/are configured to be stationary (immovable), i.e. in particular immovable relative to the building field. A flow guide may comprise a channel, a conduit, or a channel or conduit section. A flow inlet can (depending on the direction of flow) have the function of an outlet opening or inlet opening for gas. A gas outlet may be provided as an outlet opening for gas from a process chamber, or a gas inlet may be provided as an inlet opening for gas into a process chamber.

By arranging the central flow guide in a recess region that is not part of the building field and therefore does not have to be flowed over during production, such as the inner area of an annular building field, the building field is not shaded by the flow guide and the length of the building field to be flowed over (in the radial direction) is shortened. The flow path over or through the building field region is reduced. In this way, laminar flow over the building field can be achieved even for large components that have a (central) recess. This avoids turbulence of the building material in the buildup area, maintains a uniform layer thickness of the building material, and thus enables a manufacturing process for high component quality at high manufacturing speeds, especially for relatively large components.

In an advantageous further embodiment of the invention, the outer flow guide and the central flow guide are configured to be arranged above the building field. In particular, the flow openings of the flow guides can be arranged directly above the building field, whereby an improved flow guide can be achieved with regard to its effect. However, it is also possible to arrange the outer flow guide and/or the central flow guide in or below the plane of the building field (working plane). For example, flow openings of the outer flow guide could be aligned upwards in order to draw off gas downwards.

In an advantageous further embodiment of the invention, the outer flow guide and/or the central flow guide are/is configured to be immovable in a circumferential direction of the building field. In particular, the outer and/or inner central flow guide are arranged immovably, i.e. stationary, relative to the building field. In particular, outer and/or the central flow guide are designed or arranged immovably in the circumferential direction, preferably in the circumferential direction and in the radial direction, of the building field, preferably along the entire circumferential direction. The circumferential direction can be understood as a boundary line (contour) of the building field, which in particular corresponds to the course of the inner wall of the container or the outer wall of the container. In particular, the outer flow guide and/or the central flow guide are not designed to be entrained with an irradiation zone of the building field, i.e. the flow guides are in particular not entrained with the coater and/or an irradiation unit. This makes it possible to dispense with a complex control system, in particular to coordinate the movement of the irradiation units with the movement of the flow guides. Collisions between different flow guides are ruled out.

In an advantageous further embodiment of the invention, outer contours of a housing of the central flow guide, in particular the orientation of the at least one flow opening, are adapted to contours of the building field delimiting the building field recess region. In particular, the shape of the building field recess follows the contour (contour line) of the building field or nestles against these contours. In particular, the shape of the recess in the building field corresponds to the shape of the inner wall of the container or the outer wall of the container. Preferably, the flow openings (at points along the circumferential direction) are aligned at least substantially perpendicularly to the contours (contour line) of the building field. In particular, the flow openings are aligned in the radial direction.

In an advantageous further embodiment of the invention, the building field is shaped in such a way that the surface center of gravity of the building field lies outside the contours of the building field. In particular, the surface center of gravity of the building field lies outside the area of the building field, preferably within the (central) building field recess region. For a building field shaped in this way, the arrangement of the central flow guide in the building field recess region can achieve a significant shortening of the flow path across the building field, i.e. in particular between the central flow guide and the outer flow guide.

In an advantageous further embodiment of the invention, the outer flow guide and/or the central flow guide each has at least one, preferably radially aligned, flow guide element for influencing the flow direction of the gas flow over the building field. In particular, several radial lamellas, flow guide grids and/or perforated plates distributed over the circumferential direction of the building field are provided. Preferably, a plurality of flow guide elements are arranged (uniformly) distributed over the entire circumferential direction of the central flow guide. In this way, the radial flow direction of the gas flow over the building field is determined.

In an advantageous further embodiment of the invention, the central flow guide comprises at least one connection opening for connection to the gas discharge or the gas supply and is configured to deflect a gas flow between the connection opening and the at least one flow opening from a substantially axial flow direction to a radial flow direction, or vice versa. The central flow guide may have flow deflection sections, for example at least one bent channel or conduit section, preferably with a deflection angle of about 90°. In this way, gas can be supplied to the building field coming from above (axially) through the central flow guide and directed onto the building field in the radial direction or discharged upwardly (axially) coming from the radial direction via the building field. The supply or discharge of gas from or to the top through the central flow guide arranged in the recess region of the building field does not cause any shadowing of the building field and enables the irradiation units to irradiate the building field without restriction.

In an advantageous further embodiment of the invention, the central flow guide and/or the outer flow guide each comprise a plurality of openable and closable flow openings, in particular openable and closable nozzles with flow openings, wherein flow openings preferably associated with a specific radial segment of the building field are openable and closeable. A radial segment can be understood as a partial area of the building field extending in the radial direction of the building field, in particular a circular sector or a sector over a certain angular range) (<360°). By closing the flow openings, certain radial segments can be excluded from the flow. In particular, flow openings of the outer and central flow guide, which are assigned to certain radial segments of the building field, can be opened or closed at least in a substantially synchronized manner. In this way, the flow can be restricted to an area of the building field in which the component is currently being built up.

In an advantageous further embodiment of the invention, at least one flow opening of the central flow guide is connectable to the gas supply and at least one flow opening of the outer flow guide is connectable to the gas discharge, wherein in particular a gas flow running essentially in a radial flow direction outwards over the building field is generatable. Alternatively, at least one flow opening of the outer flow guide is connectable to the gas feed and at least one flow opening of the central flow guide is connectable to the gas discharge, so that an essentially radial flow from the outside inwards over the building field is established. Preferably, however, gas is injected via the central flow guide and exhausted via the outer flow guide.

In an advantageous further embodiment of the invention, a first flow opening of the central flow guide is connectable to the gas supply and a second flow opening of the central flow guide can be connected to the gas discharge and/or a first flow opening of the outer flow guide is connectable to the gas supply and a second flow opening of the outer flow guide is connectable to the gas discharge. In particular, the respective flow openings of a central and/or outer flow guide can be arranged one above the other. By connecting the central and the outer flow guides respectively to the gas supply and the gas discharge, oppositely circulating flows can be generated over the building field. In particular, a gas flow extending substantially in a radial flow direction outwardly over the building field can be generated in a first radial region of the building field and a gas flow extending substantially in a radial flow direction inwardly over the building field can be generated in a second radial region of the building field. In a first embodiment, gas is supplied from above in a central region of the building field and flows off to both radial sides (inward and outward) or is exhausted from both radial sides. In a second embodiment, gas is supplied in both radial sides (from the inside and outside) and flows off to the top in a central region of the building field. In this way, the flow path can be further reduced in a flow direction above the building field.

The aforementioned objective is also solved in particular by a flow arrangement for flowing a building field of a manufacturing device for additive manufacturing of three-dimensional components by layer-by-layer application and locally selective solidification of a building material within the building field by means of a plurality of irradiation units, comprising the inventive flow system, wherein the outer flow guide and the central flow guide are arranged outside a building field usable for manufacturing the component, wherein the, in particular annular, building field extends in a radial direction and is delimited by a, preferably central, building field recess which is not useable for manufacturing the component, wherein the outer flow guide is arranged in a building field outer region, which is arranged outside the building field in an outward radial direction, and the central flow guide is arranged in a, preferably central, building field recess region, which is arranged in an inward radial direction outside the building field, to generate in particular one gas flow running in at least one essentially radial flow direction over the building field.

Such a flow arrangement has the same advantages as already described in connection with a flow system according to the invention. In particular, all described further embodiments of a flow system according to the invention are also applicable to the flow arrangement or can be implemented by a corresponding arrangement of the flow system.

In an advantageous further embodiment of the flow arrangement according to the invention, a vertical distance between the building field and a flow opening, in particular a center axis of a flow opening, is less than an opening height, preferably less than half an opening height, further preferably less than a quarter of the opening height, of the flow opening. Flow openings can be designed as (elongated) flow slots or round flow openings, in particular as nozzle openings. The smallest possible (vertical) distance between the flow openings and the building field ensures that the flow over the building field is as close as possible, thus ensuring effective removal of impurities.

The mentioned objective is also solved in particular by the use of a flow system or flow arrangement which has an outer flow guide with at least one flow opening and a central flow guide with at least one flow opening, for flowing a, in particular annular, building field of a manufacturing device for the additive manufacturing of three-dimensional components, in particular by layer-by-layer application and locally selective solidification of a building material within the building field by means of a plurality of irradiation units, wherein a building field which is useable for the manufacture of the component extends in a radial direction and is delimited from a, preferably central, building field recess which is not usable for the manufacture of the component. In particular, a flow system or flow arrangement according to the invention that is used to generate a gas flow extending in at least one substantially radial flow direction over the building field.

The mentioned objective is further solved in particular by a manufacturing device for additive manufacturing of three-dimensional components by layer-by-layer application and locally selective solidification of a building material by means of a plurality of irradiation units, comprising:
 a process chamber;
 at least one gas supply for supplying gas into the process chamber;
 at least one gas discharge for discharging gas from the process chamber;
 a building container open to the process chamber for receiving the building material and at least one component to be manufactured,
  wherein the, in particular annular, building container at least partially surrounds a, preferably central, container recess,
  wherein a, in particular annular, building field useable for manufacturing the component is provided above the building container, extends in a radial direction and is delimited from a, preferably central, building field recess which is not usable for manufacturing the component,
  wherein a, preferably central, building field recess region arranged in an inward radial direction outside the building field coincides with a cross-sectional area of the container recess; and
 a flow system for flowing the building field, in particular a flow system according to the invention,
  which comprises at least one outer flow guide with at least one flow opening and at least one central flow guide with at least one flow opening, wherein at least one first flow opening is connectable to the gas discharge and at least one second flow opening is connectable to the gas supply in a gas-conducting manner,
  wherein the outer flow guide is arranged in a building field outer region, which is arranged outside the building field in an outward radial direction, and the central flow guide is arranged in the building field recess region, to generate in particular one gas flow extending in at least one substantially radial flow direction over the building field.

In particular, a cross-sectional area of the container recess lies in a (horizontal) cross-sectional plane through the building container, which is preferably parallel to or coincides with the building field of the manufacturing device. In particular, the building field region extends above the building field, with the building field recess region extending above the container recess (and the container inner wall). In particular, the volume of the container recess complements the volume of the receiving area (hollow volume) of the building container (plus the container wall).

A manufacturing device according to the invention comprises, in particular, a flow system or flow arrangement according to the invention for flowing the building field and has advantages corresponding to those already described above. In particular, the manufacturing device has a simple structure and can be easily controlled for manufacturing. The further embodiments of the flow system and flow arrangement described above can be implemented in the manufacturing device according to the invention.

In an advantageous further embodiment of the invention, the building container is shaped such that the surface center of gravity of a cross-sectional area of the receiving area of the building container lies outside the receiving area of the building container, in particular outside a building container wall. Preferably, the surface center of gravity of the receiving area of the container is located in the (central) container recess. For a building container formed in this way, a significant shortening of the flow path across the building field, i.e. in particular between the central flow guide and the outer flow guide, can be achieved by arranging the central flow guide in the building field recess region (above the container recess). By arranging the central flow guide in the recess region which is not used for manufacturing or is not irradiated by the irradiation units, a radial gas flow over the building field can be achieved which requires only a relatively short flow path compared to a flow over the entire building field from one side to the other.

In an advantageous further embodiment of the invention, the receiving area of the building container comprises an annular, annular-segment-shaped, kidney-shaped, U-shaped, L-shaped or rectangular-frame-shaped cross-sectional area, wherein in particular the cross-sectional areas of the container recess, the container wall and the receiving area complete each other. Such shapes of the building container are examples of appropriately shaped components to be received and building fields (defined by the upper opening shape of the building container) for which radial gas flows can be implemented. The receiving area can be circular in particular, but can also be oval or elliptical in shape.

In an advantageous further embodiment of the invention, the building container comprises an outer container wall and an inner container wall enclosing the container recess, the inner container wall having, in particular, curved and/or straight wall sections and preferably being designed as a hollow cylinder. Annular components are received, for example, in an annular building container with a cylindrical (inner or central) container recess. In particular, the inner container wall defines the inner contours of the building field. The container recess (or the building container) may have a rectangular, square, elliptical, oval, circular, or similar cross-section. The inner wall of the container preferably has a small wall thickness (compared to the radial dimension of the building field) and is in particular adapted to the shape of the outer wall of the building container, which it bounds (inwardly).

In particular, the building field has an inner diameter of at least 0.2 m, preferably of at least 0.3 m, further preferably between 0.3 m and 1.4 m, wherein a radial dimension of the building field is in particular at least 0.02 m, preferably at least 0.05 m, further preferably at most 0.7 m. The radial dimension can be understood as a distance between the container inner wall and the container outer wall. For example, the container recess may have a diameter or diagonal length of at least 0.2 m, preferably at least 0.3 m, further preferably between 0.3 m and 1.4 m. The manufacturing device according to the invention is used in particular for large components which can be manufactured in a building container of the dimensions mentioned.

In an advantageous further embodiment of the invention, the central flow guide is replaceable, wherein on a process chamber wall in particular at least one support for the central flow guide is provided. The support is connectable to the process chamber wall and/or the central flow guide in a form-fitting manner, such as via a latching, clamping or bayonet connection, or via a screw connection. In particular, the central flow guide may have a housing that is attachable to the support. The support is connectable to the gas discharge and/or gas feed in a gas-conducting manner, the support having, in particular, at least one first connection opening for connection to the gas discharge and/or the gas feed and at least one second connection opening (adapter connection) for connection to the connection opening of the central flow guide. The support may comprise a gas discharge and/or supply section (duct section), preferably a pipe or hose section, and preferably a seal, e.g. a sealing ring, at the second connection opening. Due to the changeability of the central flow guide, the flow system or the flow arrangement can be adapted for the production of a specific component, in particular to the building container receiving the component, for example for components of different inner and/or outer diameters. The central flow guide can be designed identically for different outer diameters of components.

The mentioned objective is further solved in particular by a manufacturing method for additively manufacturing three-dimensional components by layer-by-layer application and locally selective solidification of a building material within a building field by means of a plurality of irradiation units, comprising the following steps:

a) Supplying gas via a gas supply into a process chamber of a manufacturing device for additive manufacturing of three-dimensional components, in particular a manufacturing device according to the invention;

b) Flowing the building field, in particular by an inventive flow system or by an inventive flow arrangement, wherein
   at least one flow opening of at least one outer flow guide, which is arranged outside the building field in a building field outer region, which is arranged outside the building field in an outward radial direction,
   and/or
   at least one flow opening of a central flow guide, which is arranged outside the building field in a building field recess region, which is arranged in an inward radial direction outside the building field,
   is supplied with gas via the gas supply,
   wherein a gas flow extending in at least one substantially radial flow direction over the building field is generated between the central flow guide and the outer flow guide, the gas flow in particular carrying impurities away from the building field of the radial flow direction;

c) Discharging gas from the process chamber via a gas discharge.

The manufacturing method according to the invention has similar advantages to those already described in connection with the flow system according to the invention, the flow arrangement and the manufacturing device. In particular, some or all of the method features already described can be implemented by the manufacturing method. In particular, the manufacturing method is simple to carry out and achieves a high component quality.

Embodiment examples of the invention are described in more detail below with reference to the figures. The figures show the following:

In the following description of the invention, the same reference signs are used for elements that are the same and have the same effect.

DETAILED DESCRIPTION

Figure 1A:
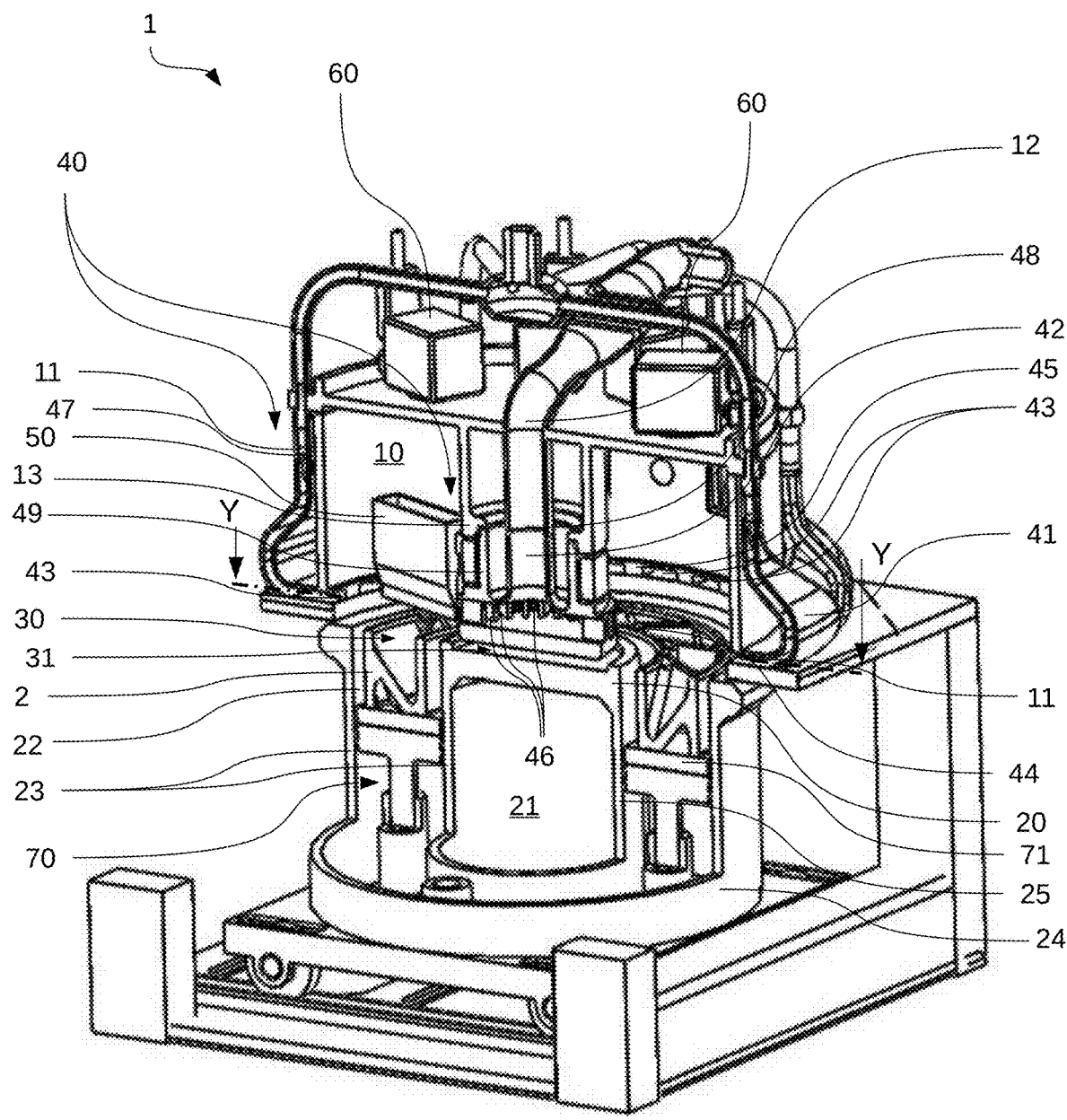
FIG. 1A a schematic representation of an embodiment of the manufacturing device or flow arrangement according to the invention in a partial sectional perspective view.

FIG. 1A shows a manufacturing device 1 for additive manufacturing of components according to the invention, which can be designed as a laser sintering or laser melting device. For building up a component 2, it contains a process chamber 10. A building container 20 open at the top with a container wall 23 is arranged below the process chamber 10, in which a component 2 is built up layer by layer. The container wall 23 comprises a hollow-cylindrical container inner wall 25 and a container outer wall 24 surrounding container inner wall 25. The component 2 received or being formed in the receiving area 22 of the building container 20 is annular in shape here. A building field 30 is defined by the upper opening of the building container 20, which can be used for the additive manufacturing of a three-dimensional component 2. A carrier 71, which can be moved in a vertical direction B by means of an adjustment mechanism 70, is arranged in the building container 20, forms the base of the building container 20 and supports the component 2. The coater 50 for applying the building material is arranged above the building field 30 and is controllably movable. In the present embodiment, the coater 50 for producing an annular component 2 is movable in the circumferential direction over the building field 30. In operation, to apply a powder layer, the carrier 71 is first lowered to a height corresponding to the thickness of the layer to be applied. A layer of the powdered building material is then applied by moving the coater 50 over the building field 30. The powdered building material is applied over at least the entire cross-section of the component 2 to be manufactured, preferably over the entire surface of the building field 30. The irradiation units 60 comprise lasers that generate laser beams as energy beams, which are directed onto the building field 30 via an optical system and a coupling window at the top of the process chamber 10 (not shown). The irradiation units 60 are controllable to irradiate the building field 30 such that building material deposited layer by layer within the building field is locally selectively solidified such that the desired structure of the component 2 is formed. By building up the component 2 in vertical direction B through layers applied and solidified above, but lowering it by the corresponding layer thickness via the adjustment mechanism 70 after each layer build-up, the building field 30 remains at a fixed equal height in a working plane during the manufacturing process.

Due to the impingement of laser beams from the irradiation units 60 the building material locally melts, which can cause impurities in the process atmosphere, such as spatter, smoke or condensate. On the one hand, impurities can be removed from the building field 30 by flowing gas (process gas) over the building field 30. On the other hand, oxidation of the building material at the process point can be prevented to the greatest possible extent. For generating a preferably laminar gas flow in the process chamber 10 (horizontally) above the building field 30, the manufacturing device 1 comprises a gas supply 12 and a gas discharge 11, which are each connected to an outer flow guide 41 and a central flow guide 42 of a flow system 40 according to the invention or a flow arrangement according to the invention. The outer flow guide 41 and the central flow guide 42 have flow openings 43, 43a, 43b and 44, 44a, 44b, respectively, each of which can serve as a gas outlet or a gas inlet. The gas extracted from the process chamber 10 via the gas outlet 11 can be fed into a filter device (not shown) and fed back to the process chamber 10 via the gas inlet 12, thus forming a recirculation system with a closed gas circuit. The central flow guide 42 is attached to the process chamber wall 14, here to the top of the process chamber 10, via the support 13.

The outer flow guide 41 is arranged in the building field outer region 33 of the building field and the central flow guide 42 in the building field recess region 31 of the building field. The building field outer region 33 is located outside the building field 30 in the radial direction R outward of the building field 30 or of the building field region 32 lying congruently above the building field 30. The building field recess region 31, which is also located outside (in the radial direction R inwards) of the building field 30, is separated from the building field region 32, with the building field recess region 31 being enclosed by the building field region 32. The geometry of the building field recess region 31 is at least determined by the geometry of the container recess 21 of the building container 20.

Due to the arrangement of the central flow guide 42 in the building field recess region 31, the building field 30 is not shadowed and can be irradiated unhindered by the irradiation units 60. In addition, the central flow guide 42 can thereby be positioned at a very small vertical distance from the building field 30, in particular in the immediate vicinity, preferably immediately above, the working plane. As a result, the gas flow is guided as closely as possible over the building field 30 and can effectively dissipate process waste gases. A significant advantage of the arrangement of the central flow guide 42 according to the invention is that a radial gas flow can be generated over the building field 30 and thus the flow path of the gas flow over the building field 30 is reduced, in particular in comparison with a flow in a uniform direction from one side of the building field to the other, which is customary in the prior art. In this way, it can be achieved that the flow remains laminar and does not become turbulent even with large components 2.

Figure 1B:
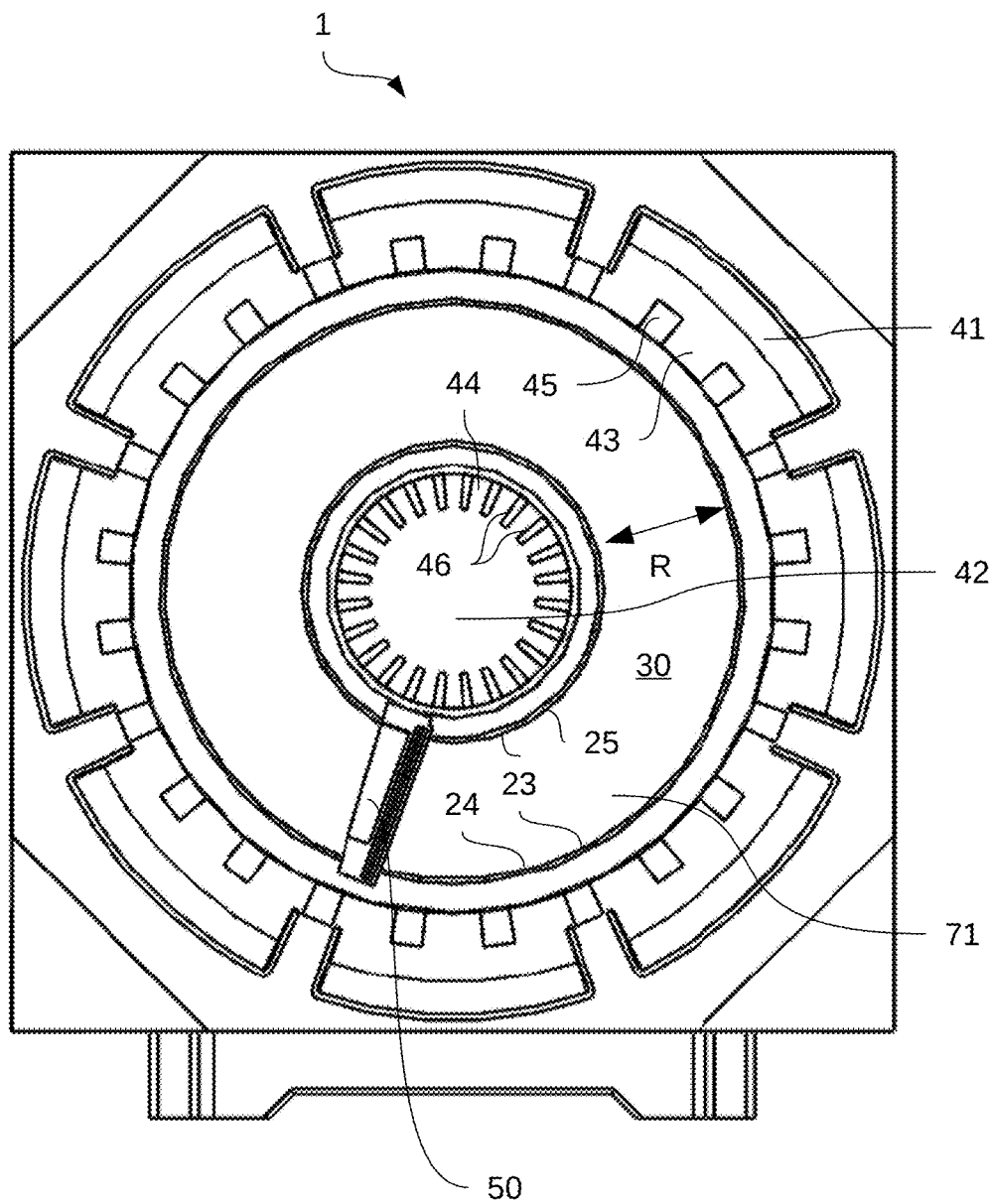
FIG. 1B the embodiment according to FIG. 1A in a top view of section Y-Y.

In the cross-section through the manufacturing device 1 at the level of the outer flow guide 41 and the central flow guide 42 shown in FIG. 1B, the flow guide elements 45, 46 of the outer flow guide 41 and the central flow guide 42, respectively, are visible, whereby the component 2 is not shown. The flow guide elements 46 are designed as radial lamellas, which guide gas in radial direction R over the building field 30. The flow guide elements 45 are also oriented in radial direction R. The flow guide elements 45, 46 may be configured to redirect an axial flow into a radial flow, or vice versa. Alternatively, the flow guide elements 45, 46 may ensure a radial laminar flow, while the deflection of an axial flow into a radial flow is produced by the curvature of separate deflection elements of the flow guides 41 or 42. The flow openings 43, 44 are arranged uniformly distributed over the circumference of the manufacturing device 1 and can be opened and closed. By closing the flow openings 43, 44, a specific radial segment of the building field 30 can be (temporarily) excluded from the flow, for example if no irradiation of this radial sector is currently taking place. In this way, a larger gas flow can be provided for the remaining radial segments with open flow openings 43, 44. Flow openings 43, 44 can be opened and closed, for example, by controllable flaps or adjustable lamellas.

Figure 2A:
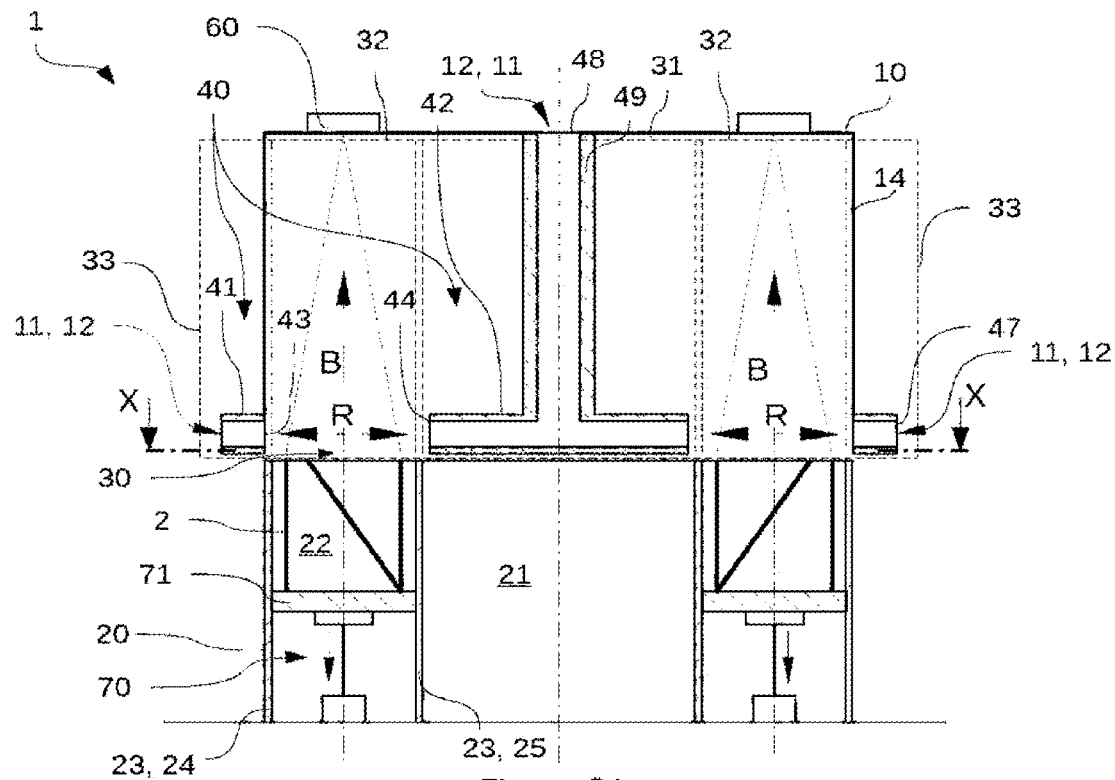
FIG. 2A a schematic representation of an embodiment of the manufacturing device or flow arrangement according to the invention in a longitudinal section.

The embodiment according to FIG. 2A functions essentially in the same way as the embodiment according to FIG. 1A. The building field outer region 33, the building field region 32 and the building field recess region 31 are schematically indicated by dashed lines in FIG. 2A. Beams from the irradiation units 60 impinging on the building field 30 are also shown. The component 2 is shown in the building container 20 on the carrier 71 in an intermediate fabrication state, in which a plurality of applied layers have already been solidified and the component 2 is surrounded by building material that has remained unsolidified. The annular component 2 is already largely finished and, by way of example, has a Z-shaped cross-section. The vertical direction B is drawn vertically upwards.

The process chamber 10 has a process chamber wall 14, on which external flow guides 41 are arranged, which are connectable in a gas-conducting manner to gas supply lines 12 or gas discharge lines 11 via connection openings 47. Via a connection opening 48 in a cover of the process chamber 10, the housing 49 of the central flow guide 42 is connectable in a gas-conducting manner to a gas discharge 11 or a gas supply 12. It is possible to supply gas to the building field via the central flow guide 42 and to discharge it via the outer flow guide 41, or vice versa (see FIGS. 3 to 6). It is also possible to supply and discharge gas via the central flow guide 42 and/or supply and discharge gas via the outer flow guide 41 (see FIGS. 7 and 8). This allows different radial gas flows to be generated, for example depending on the component geometry or the respective process requirements. Outer and central flow guides 41, 42 are arranged immovably in the circumferential direction U and radial direction R of the component field 30, i.e. stationary.

Figure 2B:
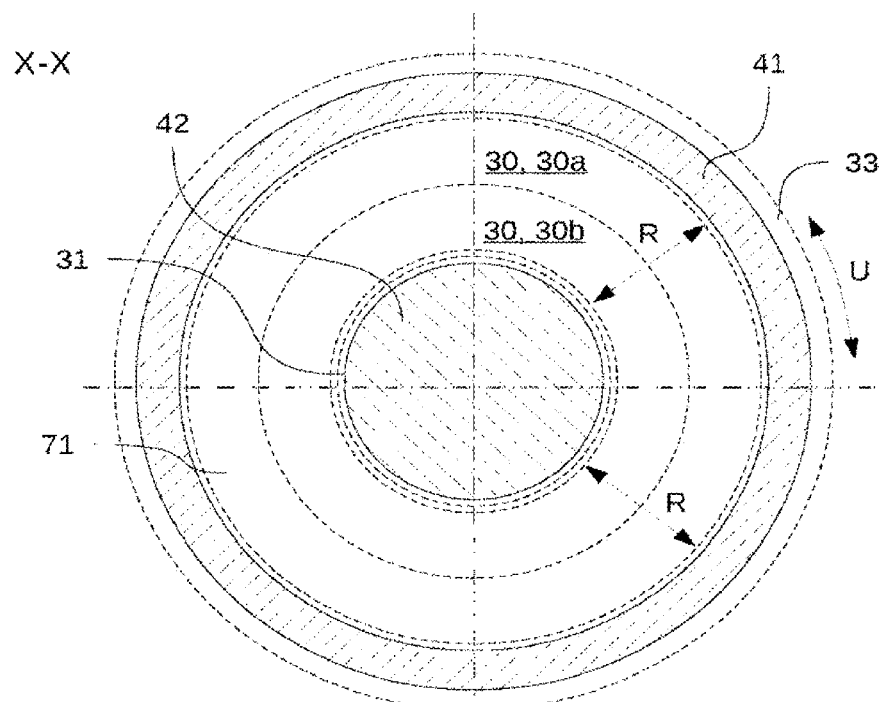
FIG. 2B the embodiment according to FIG. 2A in a top view of section X-X.

In FIG. 2B, the radial direction R is depicted, which is directed from the inside to the outside, or vice versa, in particular at any point perpendicular to the contours of the building field 30. The contours of the building field 30 are here an inner and an outer circle, which delimit the annular building field 30. The circumferential direction U runs around the building field 30. The building field 30 consists of a first (outer) radial region 30a and an (inner) radial region 30b.

FIGS. 3 to 8 show schematic representations of various embodiments of the manufacturing device or flow arrangement according to the invention, wherein gas flows in each case in at least one radial direction over the building field 30. The respective flow directions are illustrated by arrows.

Figure 3:
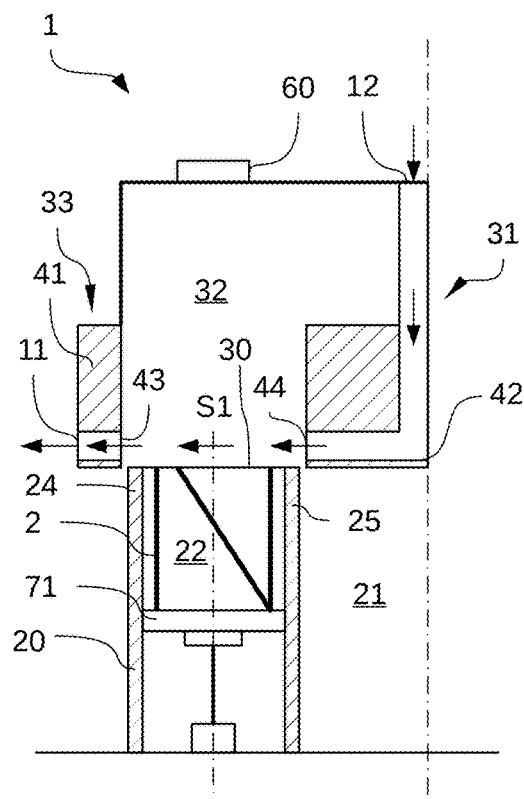
FIG. 3 a schematic representation of an embodiment of the manufacturing device or flow arrangement according to the invention with a radial flow from the inside to the outside in a half section.
Figure 4:
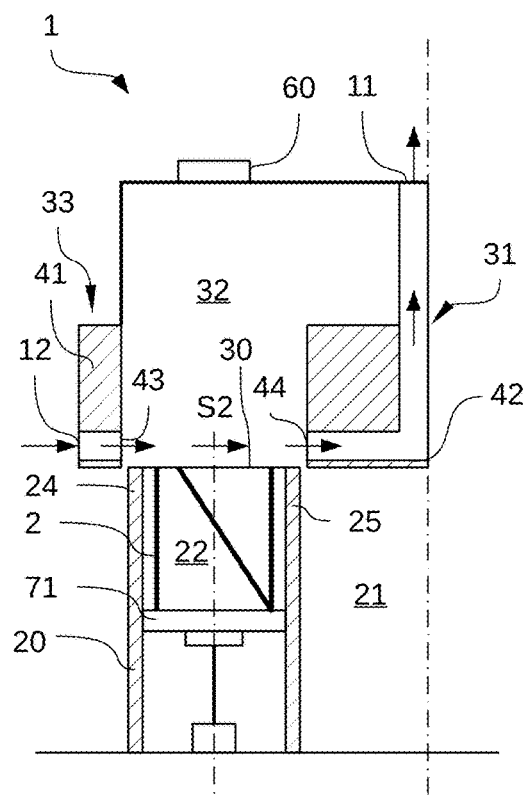
FIG. 4 a schematic representation of an embodiment of the manufacturing device or flow arrangement according to the invention with a radial flow from the outside to the inside in a half section.
Figure 5:
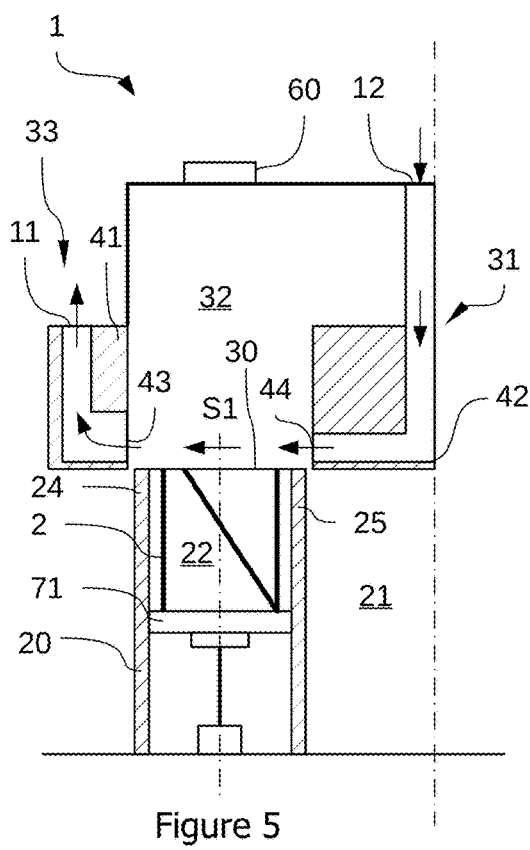
FIG. 5 a schematic representation of an embodiment of the manufacturing device or flow arrangement according to the invention with a radial flow from the inside to the outside and a gas discharge to the top in a half section.
Figure 6:
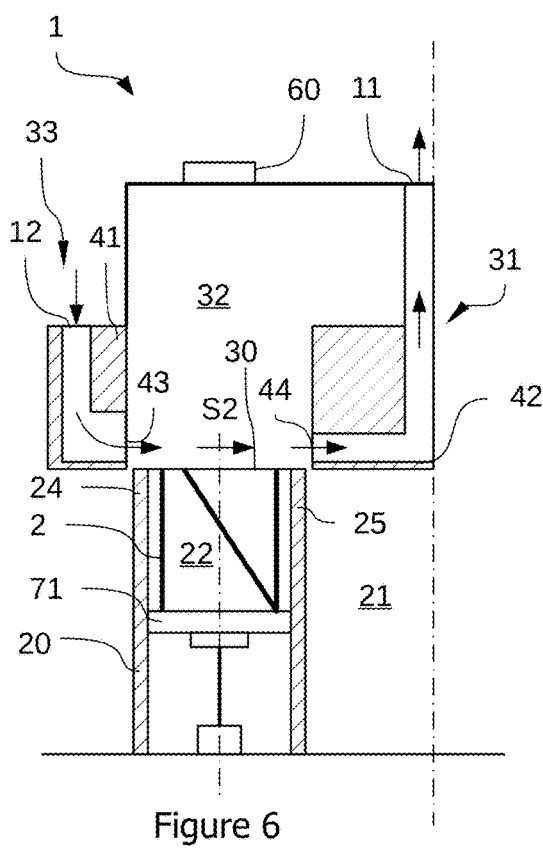
FIG. 6 a schematic representation of an embodiment of the manufacturing device or flow arrangement according to the invention with gas supply from above and a radial flow from the outside to the inside in a half section.

FIGS. 3 to 6 each show gas flows in one of two radial flow directions S1, S2. In FIGS. 3 and 5, gas is supplied via the central flow guide 42 and discharged via the outer flow guide 41. As a result, the gas flow is directed outward across the building field 30 in radial flow direction Si. In FIGS. 4 and 6, gas is supplied via the outer flow guides 41 and discharged via the central flow guide 42. As a result, the gas flow over the building field 30 is directed inward in radial flow direction S2. In FIGS. 5 and 6, the outer flow guide 41 is configured to deflect the gas flow from radial to axial direction, or vice versa. In preferred embodiments, process gas is injected through the central flow guide in 42 and exhausted through the outer flow guides 41 (see FIGS. 3 and 5). The building field region 32 located above the building field 30 is delimited from the building field recess region 31 and the building field outer region 33, as shown by dashed lines.

Figure 7:
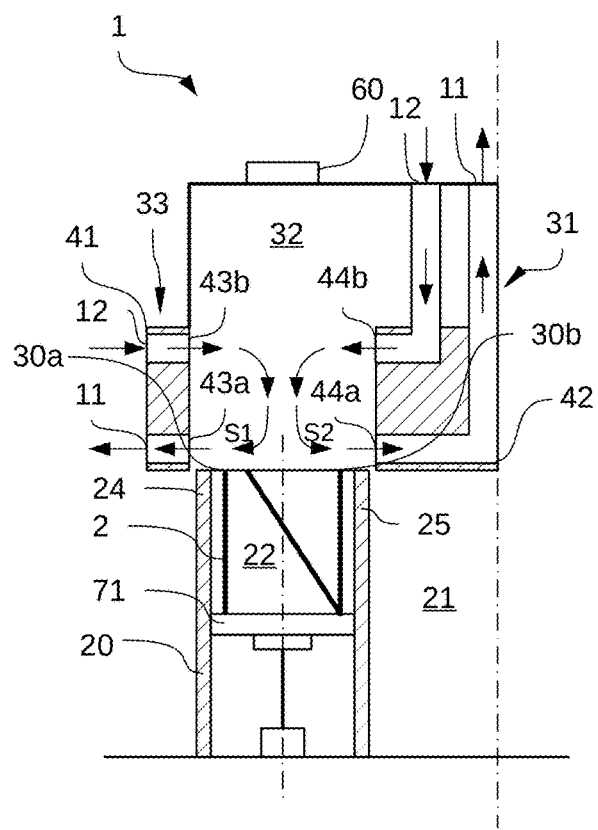
FIG. 7 a schematic representation of an embodiment of the manufacturing device or flow arrangement according to the invention, with a radial flow from the center of the building field radially inwards and outwards in a half section.
Figure 8:
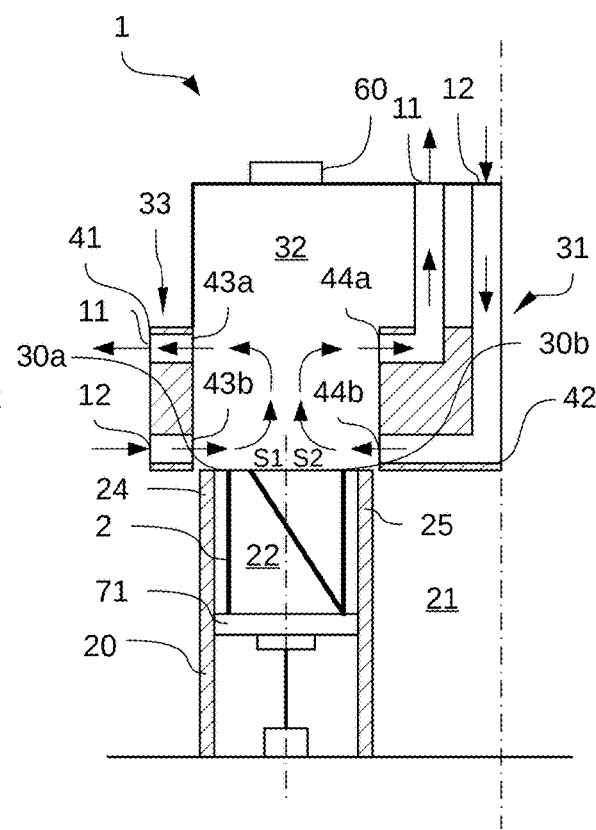
FIG. 8 a schematic representation of an embodiment of the manufacturing device or flow arrangement according to the invention with a radial flow from the outside and inside radially to the center of the building field in a half section.

In FIGS. 7 and 8, the flow guides 41, 42 are each connected to a gas outlet 11 and a gas inlet 12, with the flow openings 43a, 43b and 44a, 44b arranged one above the other in height. This creates oppositely circulating flows over the building field 30. The flow openings 43b and 44b are connected to the gas supply 12 and the flow openings 43a and 44a are connected to the gas discharge 11. In FIG. 7, in a first (outer) radial region 30a of the building field 30, the gas flow is directed outward in a radial flow direction S1, while in a second (inner) radial region 30b of the building field 30, it is directed inward in a radial flow direction S2. In FIG. 8, a gas flow is conversely directed inwardly in a first (outer) radial region 30a of the building field 30 in a radial flow direction S2, while it is directed outwardly in a second (inner) radial region 30b of the building field 30 in a radial flow direction S1. The building field region 32 lying above the building field 30 is delimited from the building field recess region 31 and the building field outer region 33, as indicated by dashed lines.

REFERENCE SIGNS

1 Manufacturing device
2 Component
10 Process chamber
11 Gas discharge

12 Gas supply
13 Support
14 Process chamber wall
20 Building container
21 Container recess
22 Receiving area
23 Building container wall
24 Container outer wall
25 Container inner wall
30 Building field
30a First radial region of the building field
30b Second radial region of the building field
31 Building field recess region
32 Building field region
33 Building field outer region
40 Flow system
41 Outer flow guide
42 Central flow guide
43, 43a, 43b Flow opening
44, 44a, 44b Flow opening
45 Flow guide element
46 Flow guide element
47 Connection opening
48 Connection opening
49 Housing
50 Coater
60 Irradiation unit
70 Adjustment mechanism
71 Carrier
B Vertical direction
R Radial direction
U Circumferential direction
S1 Radial flow direction outward
S2 Radial flow direction inward

What is claimed is:

1. A flow system for a building field of a manufacturing device for additive manufacturing of a three-dimensional component by layer-by-layer application and locally selective solidification of a building material within the building field using irradiation units, the flow system comprising:
   an outer flow guide arranged outside the building field usable for manufacturing the three-dimensional component and having an outer flow opening and an outer connection opening, the outer connection opening connectable in a gas-conducting manner to one of a gas discharge for discharging gas from a process chamber and a gas supply for supplying the gas to the process chamber; and
   a central flow guide arranged above a working plane of the building field and outside the building field usable for manufacturing the three-dimensional component and having a central flow opening and a central connection opening, the central connection opening connectable in a gas-conducting manner to one of the gas discharge for discharging the gas from the process chamber and the gas supply for supplying the gas to the process chamber,
   wherein the building field extends in a radial direction and is delimited by a building field recess region where beams of the irradiation units do not reach or that is not covered by the building material; and
   wherein the central flow guide is arranged in the building field recess region and extends to a location in an immediate vicinity of the building field.

2. The flow system according to claim 1, wherein the outer flow guide and the central flow guide are configured to be arranged above the building field.

3. The flow system according to claim 1, wherein the outer flow guide or the central flow guide is configured in an immovable arrangement in a circumferential direction of the building field.

4. The flow system according to claim 1, wherein an outer contour of a housing of the central flow guide and the central flow opening are adapted to a contour of the building field delimiting the building field recess region.

5. The flow system according to claim 1, wherein the outer flow guide comprises a flow guide element for influencing a flow direction of gas flow over the building field.

6. The flow system according to claim 1, wherein the central connection opening is configured to deflect a gas flow between the central connection opening and at least one flow inlet from a substantially axial flow direction to a radial flow direction, or vice versa.

7. The flow system according to claim 1, wherein the central flow guide and the outer flow guide each comprise a plurality of flow openings associated with a specific radial segment of the building field and having openable and closable nozzles.

8. The flow system according to claim 1, wherein a vertical distance between the building field and the outer flow opening or the central flow opening is less than an opening height of the outer flow opening or less than an opening height of the central flow opening.

9. A manufacturing device for additive manufacturing of a three-dimensional component by layer-by-layer application and locally selective solidification of a building material using irradiation units, the manufacturing device comprising:
   a process chamber;
   at least one gas supply for supplying gas into the process chamber;
   at least one gas discharge for discharging the gas from the process chamber;
   a building container open to the process chamber for receiving the building material and at least one component to be manufactured; and
   a flow system comprising:
      an outer flow guide arranged outside a building field usable for manufacturing the three-dimensional component and having an outer flow opening and an outer connection opening, the outer connection opening connectable in a gas-conducting manner to one of the at least one gas discharge for discharging the gas from the process chamber and the at least one gas supply for supplying the gas to the process chamber; and
      a central flow guide arranged above a working plane of the building field and outside the building field usable for manufacturing the three-dimensional component, the central flow guide having a central flow opening and a central connection opening, the central connection opening connectable in a gas-conducting manner to one of the at least one gas discharge for discharging the gas from the process chamber and the at least one gas supply for supplying the gas to the process chamber,
      wherein the building field extends in a radial direction and is delimited by a building field recess region where beams of the irradiation units do not reach or that is not covered by the building material; and
      wherein the central flow guide is arranged in the building field recess region and extends to a location in an immediate vicinity of the building field.

10. The manufacturing device according to claim 9, wherein the building container is shaped such that a surface center of gravity of a cross-sectional area of a receiving area of the building container lies outside the receiving area of the building container and outside a building container wall.

11. The manufacturing device according to claim 9, wherein a receiving area of the building container comprises an annular, annular-segment-shaped, kidney-shaped, U-shaped, L-shaped or rectangular-frame-shaped cross-sectional area.

12. The manufacturing device according to claim 9, wherein the building container comprises a container outer wall and a container inner wall enclosing a container recess, the container inner wall having a curved or straight wall section, and configured as a hollow cylinder.

13. The manufacturing device according to claim 9, wherein the central flow guide is replaceable, and wherein on a process chamber wall, at least one support for the central flow guide is provided.

14. An apparatus for additive manufacturing of a three-dimensional object in layerwise fashion through selective solidification of a powder building material using at least one irradiation unit that generates at least one beam which is directed to points on each layer of material located on a build surface corresponding to cross sections of the three-dimensional object, the apparatus further comprising:
  a process chamber;
  at least one irradiation unit located above the process chamber;
  a ring shaped annular building field within the process chamber, the build surface forming a bottom of the ring shaped annular building field for each layer of material deposited thereon, the ring shaped annular building field having an inboard side facing a vertical central axis of the process chamber and an outboard side facing radially away from the vertical central axis, the ring shaped annular building field being accessible to the at least one beam of the at least one irradiation unit around an entire extent of the ring shaped annular building field;
  an adjustment mechanism located below the process chamber having a base that underlies the ring shaped annular building field and for moving the base in coordination with an application of a layer of building material;
  a supply of process gas;
  a process gas flow system having
    a central flow guide having a central guide circular perimeter side concentric with and extending to a location in an immediate vicinity of the inboard side of the ring shaped annular building field and spaced from the inboard side, a perimeter side of the central flow guide having one or more gas flow openings around an entirety of the central guide circular perimeter side which gas flow openings contribute to a gas flow pattern radially flowing across and parallel to the build surface;
    an outer ring shaped flow guide concentric with the outboard side of the ring shaped annular building field and spaced from the outboard side, the outer ring shaped flow guide having an outer guide circular perimeter side facing the outboard side with one or more gas flow openings around an entirety of a perimeter of the outer ring shaped flow guide which contribute to the gas flow pattern;
    the one or more gas flow openings of the central flow guide and the outer ring shaped flow guide combining to generate the gas flow pattern that moves process gas from the inboard side to the outboard side of the ring shaped annular building field or from the outboard side to the inboard side of the ring shaped annular building field.

15. The apparatus of claim 14, wherein the central flow guide is a disk shaped manifold with the one or more gas flow openings around a perimeter of the disk shaped manifold.

16. The apparatus of claim 15, wherein the disk shaped manifold has a plurality of openings around an entirety of the perimeter of the disk shaped manifold, at least some of the one or more gas flow openings being operable from an open to a closed position for selective process gas movement to or from the disk shaped manifold.

17. The apparatus of claim 14, wherein the outer ring shaped flow guide has a manifold with a plurality of openings around the entirety of a perimeter of the disk shaped manifold.

18. The apparatus of claim 17, wherein at least some of the plurality of openings being operable from an open to a closed position for selective process gas movement to or from the manifold.

* * * * *